United States Patent [19]

Nagase et al.

[11] Patent Number: 5,359,433
[45] Date of Patent: Oct. 25, 1994

[54] IMAGE PROCESSING APPARATUS WITH REDUCED IMAGE DETERIORATION IN HIGHLIGHT PORTIONS

[75] Inventors: Yukio Nagase, Kawasaki; Kazuhisa Kemmochi, Machida, both of Japan

[73] Assignee: Canon Kabushiki Kaisha, Tokyo, Japan

[21] Appl. No.: 118,783

[22] Filed: Sep. 10, 1993

Related U.S. Application Data

[63] Continuation of Ser. No. 647,809, Jan. 30, 1991, abandoned.

[30] Foreign Application Priority Data

Feb. 1, 1990 [JP] Japan ................................. 2-20400

[51] Int. Cl.⁵ .............................................. H04N 1/40
[52] U.S. Cl. ................................... 358/466; 358/298
[58] Field of Search ............................... 358/456-457, 358/465-466, 298

[56] References Cited

U.S. PATENT DOCUMENTS

| | | | |
|---|---|---|---|
| 4,196,454 | 4/1980 | Kemmochi et al. | 358/283 |
| 4,553,173 | 11/1985 | Kawamura . | |
| 4,578,713 | 3/1986 | Tsao et al. | 358/283 |
| 4,674,857 | 6/1987 | Satomura et al. | 355/3 R |
| 4,680,645 | 7/1987 | Dispoto et al. | 358/298 |
| 4,709,250 | 11/1987 | Takeuchi | 346/160 |
| 4,733,230 | 3/1988 | Kurihara et al. | 358/728 |
| 4,763,199 | 8/1988 | Suzuki | 358/280 |
| 4,782,398 | 11/1988 | Mita | 358/280 |
| 4,783,837 | 11/1988 | Kawamura et al. . | |
| 4,800,442 | 1/1989 | Reisman et al . | |
| 4,811,037 | 3/1989 | Arai . | |
| 4,819,066 | 4/1989 | Miyagi . | |
| 4,847,654 | 7/1989 | Honma et al. . | |
| 4,847,695 | 7/1989 | Arai . | |
| 4,975,786 | 12/1990 | Katayama et al. | 358/466 |
| 4,998,122 | 3/1991 | Kanno et al. | 358/466 |
| 5,130,808 | 7/1992 | Kemmochi . | |
| 5,148,287 | 9/1992 | Kemmochi et al. . | |
| 5,159,471 | 10/1992 | Satou et al. | 358/261.3 |
| 5,161,036 | 11/1992 | Mannichi et al. | 358/466 |

FOREIGN PATENT DOCUMENTS

| | | |
|---|---|---|
| 4316199 | 7/1965 | Japan . |
| 50-119639 | 9/1975 | Japan . |
| 53-93030 | 8/1978 | Japan . |
| 62-53573 | 3/1987 | Japan . |

*Primary Examiner*—Stephen Brinich
*Attorney, Agent, or Firm*—Fitzpatrick, Cella, Harper & Scinto

[57] ABSTRACT

An image processing apparatus binarizes input multi-level pixel data by changing the same either to the minimum density data corresponding to white or to a minimum reproducible density data corresponding to the minimum density level reproducible by an image forming apparatus such as a printer, when the density defined by the input multi-level pixel data is of such a low level that it cannot be reproduced by the image forming apparatus. Error incurred by the binarization is reflected in the succeeding binarizing process so that the density of the whole image is preserved, whereby an image with a highlight portion can be recorded with reduced degradation of the image quality at the highlight portion.

22 Claims, 11 Drawing Sheets

IMAGE PROCESSING APPARATUS WITH REDUCED IMAGE DETERIORATION IN HIGHLIGHT PORTIONS

This application is a continuation of application Ser. No. 07/647,809, filed Jan. 30, 1991, now abandoned.

BACKGROUND OF THE INVENTION

The present invention relates to an image processing apparatus, and more particularly, to an image processing apparatus which can produce a half tone image from multi-level image data input thereto.

In recent years, a laser beam printer making use of electrophotographic process is attracting attention as one type of printers which can operate at a high speed with reduced noise. Such a laser beam printer is typically used for the purpose of recording data such as characters and line patterns. The images of the characters and line patterns are so-called binary images which can be expressed by two states: namely, black and white. Since reproduction of half-tone image is unnecessary, the construction of the printer can be simplified.

Methods are known which reproduce quasi-half tone image with a binary recording apparatus, such as the dither method and density pattern method. As well known to those skilled in the are however, the dither method and density pattern method are disadvantageous in that they cannot produce images with high resolution. Under this circumstance, a printer has been recently developed in which a semiconductor laser is driven by a pulse-width-modulated (PWM) image signal so that half-tone image can be formed even by binary recording methods. According to this PWM method, it is possible to obtain a print output with high degrees of resolution and gradation. In particular, this printing technique has become indispensable in color image printing apparatus.

Laser beam printers relying upon PWM methods, however, encounter with various problems peculiar to this type of printer. One of these problems pertains to lack of stability of the density in the printing of image. This problem is inherent in electrophotography. The other problem is encountered when a semiconductor laser is driven through pulse width modulation.

These problems will be discussed in more detail.

FIG. 11 shows the general construction of a printer portion used in an electrophotographic system. The printer portion has a photosensitive drum 301 adapted to be rotated in the direction of the arrow about the axis of a shaft 306, components arranged around the photosensitive drum 301 such as a charger 302, a developing unit 303, a transfer charger 304 and a cleaning device 305, and an optical system arranged at the upper side of the photosensitive drum 301 as viewed in the drawings.

The optical system includes a semiconductor laser unit 306, a polygonal mirror which rotates at a constant high speed, an f-θ lens 308, a light-shielding plate, and so forth. Time-serial digital pixel signals computed and output from an image reader or an electronic computer (not shown) are PWM modulated and delivered to the semiconductor laser unit 306. The semiconductor laser unit 306 turns on and off the generation of a laser beam in accordance with the levels of the PWM-modulated pixel signals and directs the beam towards the polygonal mirror 307. Since the polygon mirror 307 is rotating at a high constant speed, the laser beam applied to one side of the polygonal mirror 307 is reflected in an oscillatory manner so as to scan and expose the portion of the photosensitive drum between the charger 302 and the developing unit 303, from the proximal end to the distal end as viewed in the drawings.

In general, the photosensitive drum 301 exhibits changes in the exposure sensitivity and residual potential, due to a change in the environmental condition and elapse of time. In addition, the developing material such as a toner used in the developing unit 303 exhibits a large fluctuation in the developing density according to a change in the amount of charges. This problem, i.e., lack of stability of the image density, is a problem inherently possessed by electrophotographic technique itself, but significantly affects formation of low-density image by a PWM type laser printer.

FIG. 9 is a circuit diagram of a PWM circuit proposed by the assignors, while FIG. 10 is a circuit diagram showing a laser driver circuit. FIG. 12 is a timing chart illustrative of the operation of the PWM circuit.

Referring to FIG. 9, the PWM circuit includes a TTL latch circuit 401 for latching 8-bit pixel signals, a level converter 402 for converting a TTL logical level to a high-speed ECL logical level, an ECL D/A converter 403, an ECL comparator 404 for generating a PWM signal, a level converter 405 for converting an ECL logical level to a TTL logical level, a clock generator 406 for generating a clock signal 2f of a frequency which is twice as high as the pixel clock signal f, a triangular wave generator 407 for generating substantially ideal triangular wave signals, and a ½ frequency dividing circuit for conducting a ½ frequency division of the clock signal 2f. In order to enable the circuit to operate at a high speed, ECL logical circuits are arranged everywhere in the circuit.

The operation of this circuit will be explained with reference to FIG. 12.

In these Figures, signals (a) and (b) represent, respectively, the clock signal 2f and the pixel clock signal f having a period which is twice as large that of the clock signal 2f. In the triangular wave generator 40 also, a triangular wave signal (c) is generated after a ½ frequency-division of the clock signal 2f, in order to maintain the duty ratio of the triangular wave signal at 50%. Furthermore, the triangular wave signal (c) is converted to an ECL level (0 to −1 V) so as to form a triangular wave signal (d).

Meanwhile, the pixel signal latched by the latch circuit 401 is variable over 256 gradation levels between 00H (white) to FFH (black). The symbol "H" represents a hexadecimal notation code. The pixel signal (e) represents ECL voltage levels as obtained through a D/A conversion of a plurality of pixel signal values by a D/A converter 403. For instance, the pixel signal for the first pixel has a voltage of black pixel level FFH, the pixel signal for the second pixel has a voltage of a half tone level of 80 H, the pixel signal for the third pixel has a voltage of a half tone level of 40 H and the pixel signal for the fourth pixel has a voltage of a half tone level 20 H. The comparator 404 is adapted to produce, through a comparison between the triangular wave signal (d) and the pixel signal (e), PWM signals such as pulse widths T, $t_2$, $t_3$ and $t_4$. The PWM signal is then converted to a TTL level of 0 V or 5 V so as to become a PWM signal (f) which i delivered to a laser driver circuit 500.

FIG. 10 shows the laser driver circuit which is of a constant current type, and the semiconductor laser device 501. This semiconductor laser device 501 emits a laser beam when the switching transistor 502 is on and terminates the emission when the switching transistor is turned off. The switching transistor 502 cooperated with a transistor 504 in forming a transistor pair which in turn forms a current switching circuit capable of controlling on/off (conversion) of the constant current which is to be supplied to the semiconductor laser device 501, in accordance with the PWM signal input thereto. This constant current is supplied from a constant current source transistor 505 and can be varied. The input laser power value input thereto is converted into an analog voltage by a D/A converter 503 and is compared with a reference voltage. The level of the constant current is determined in accordance with the result of the comparison.

However, the following problem is still encountered even when the above-described control is conducted, due to response characteristics of the semiconductor laser device 501. Referring to FIG. 12, representing the maximum emission time per pixel by T (sec), a change in the pulse width between 0 and T (sec) theoretically should cause the semiconductor laser device 501 to emit the beam over a time which corresponds to the pulse width. Actually, however, a signal waveform (g) for driving the laser device is different from the PWM signal (f) due to the fact that the PWM signal (f) is transmitted through the semiconductor laser device 501 and the driving circuit 501, with the result that a delay is caused in the turning on and off of the laser beam. This delay does not cause any problem when the pulse width is T or $t_2$. However, when the pulse width is $t_3$, the signal for driving the semiconductor laser device cannot be completely switched to ON state. When the pulse width is $t_4$, the semiconductor laser device 501 fails even to operate materially. A beam effect (h) two-dimensionally illustrates the state of emission of the laser beam. The first pixel is completely black, so that the laser beam is kept on whole through one pixel period. However, when the pulse width of the PWM signal is extremely short as, for example, $t_3 = 10$ ns, the state of generation of the laser beam is too unstable to form an image by electrophotographic process, not to mention a problem as to whether the laser beam is actually generated. In such a case, stable formation of density can no more be expected. Thus, in the gradation expression according to the PWM method, there is a practical limit in the minimum pulse width which can form an appreciable density. If this limit is $t_3 = 10$ ns for example, gradation is always white whenever the pulse width is below this lower limit of 10 ns, i.e., in the highlight portion.

SUMMARY OF THE INVENTION

Accordingly, an object of the present invention is to provide an image processing apparatus which can overcome the above-described problems of the prior art.

Another object of the present invention is to provide an image processing apparatus which enables the known image forming apparatus having the described shortcomings to form an image which includes reduced degradation in the highlight portion.

To these ends, according to one aspect of the present invention, there is provided an image processing apparatus which receives multi-level pixel data and for delivering the received data to an image forming apparatus capable of forming a gradation image, the apparatus comprising: determining means for determining whether the density level of the input multi-level objective pixel data is below a predetermined density level; and binarizing means for binarizing the multi-level objective pixel data by changing the data either to a minimum density level or to the predetermined density level, when the determining means has determined that the density level of the multi-level objective pixel data is below the predetermined density level.

In a preferred form of the present invention, the binarizing means includes: a memory for storing data which represents whether the binarization has been done to the minimum density level at the positions of a plurality of binarized pixels in the vicinity of the multi-level objective pixel; calculating means for calculating the average density at the position of the multi-level objective pixel data in the memory; comparing means for comparing the calculated average density with the density of the multi-level objective pixel data; output means for outputting the predetermined density level as the multi-level objective pixel data when the comparing means has determined that the multi-level objective pixel data is not lower than the average density and for outputting the minimum density level as the multi-level objective pixel data when the comparing means has determined that the multi-level objective data is not higher than the average density; and storage means for storing, as the result of the binarization of the multi-level objective pixel data, the result of the comparison in the memory at the position of the objective pixel.

A further object of the present invention is to provide an image processing apparatus which can stabilize the density in the highlight portion so as to form an output image of a high quality.

To this end, the present invention provides an image processing apparatus which receives multi-level pixel data and for forming a gradation image on the basis of the received multi-level pixel data, the apparatus comprising: determining means for determining whether the density level of the input multi-level objective pixel data is below a predetermined density level; and binarizing means for binarizing the multi-level objective pixel data by changing the data either to a minimum density level or to the predetermined density level, when the determining means has determined that the density level of the multi-level objective pixel data is below the predetermined density level.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7 and 8 are illustrations of matrix patterns in different embodiments;

DESCRIPTION OF THE PREFERRED EMBODIMENTS

The preferred embodiments of the present invention will be described in detail with reference to the accompanying drawings.

Figure 1:
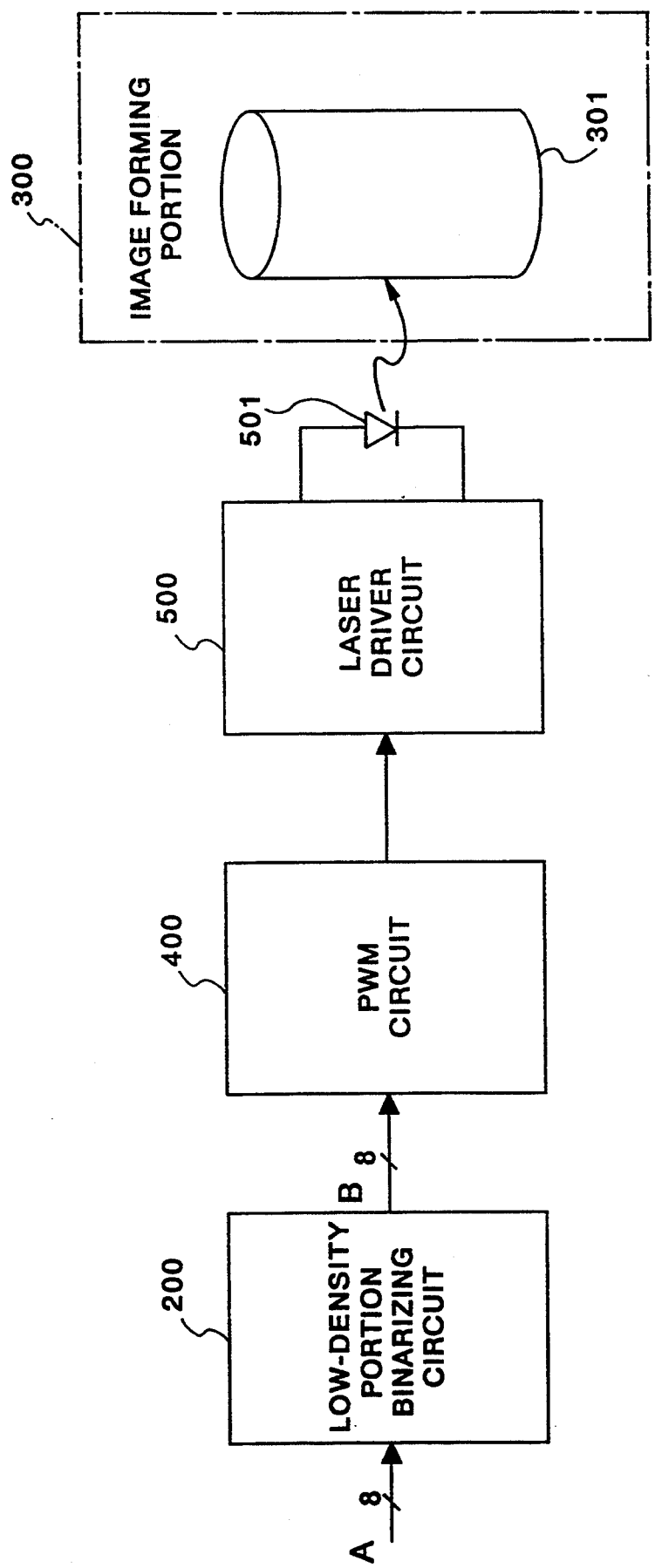
FIG. 1 is a schematic illustration of a laser beam printer embodying the present invention.

FIG. 1 is a block diagram which schematically shows the construction of a laser beam printer embodying the present invention.

Figure 9:
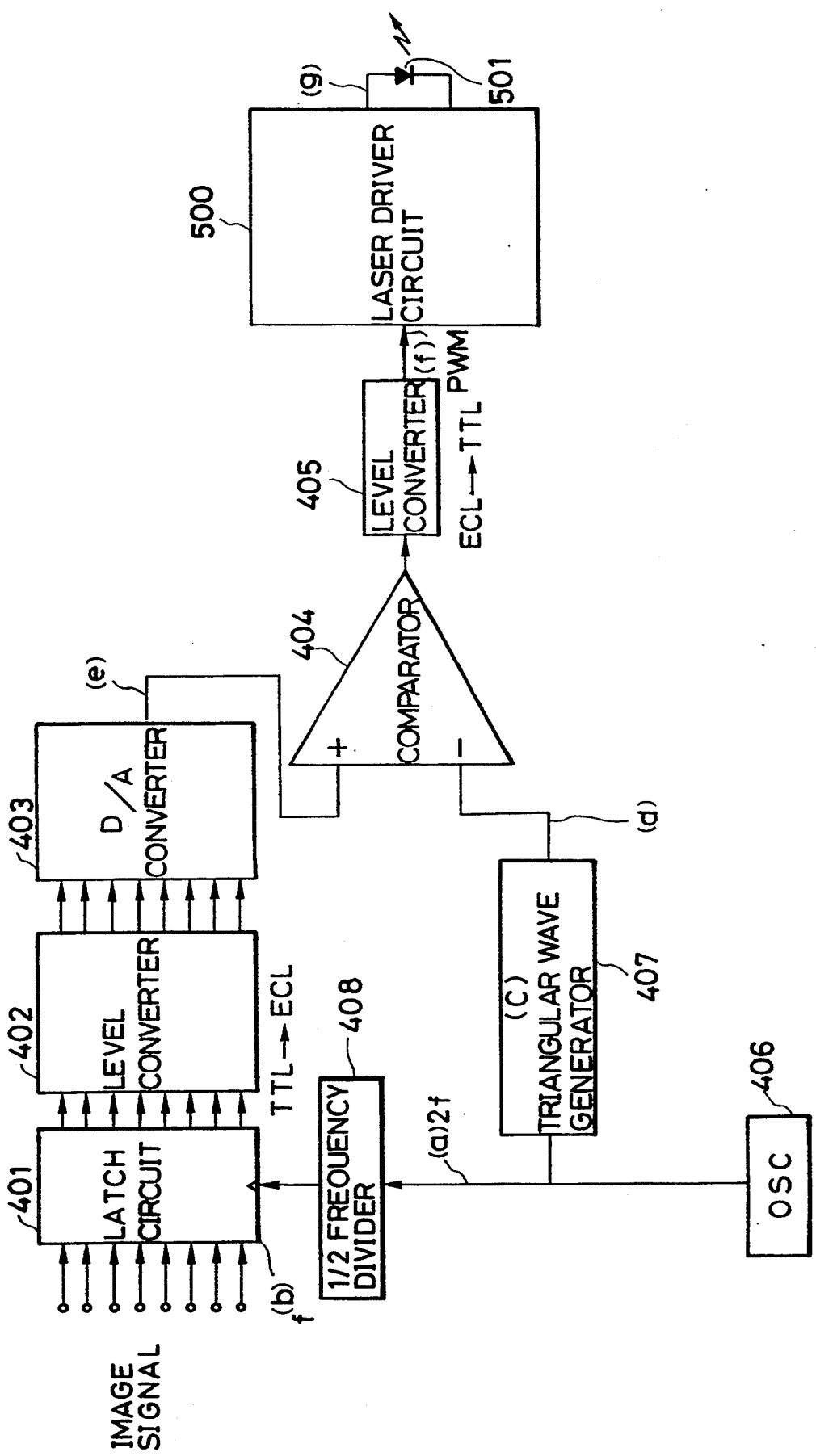
FIG. 9 is a block diagram of a PWM circuit.
Figure 10:
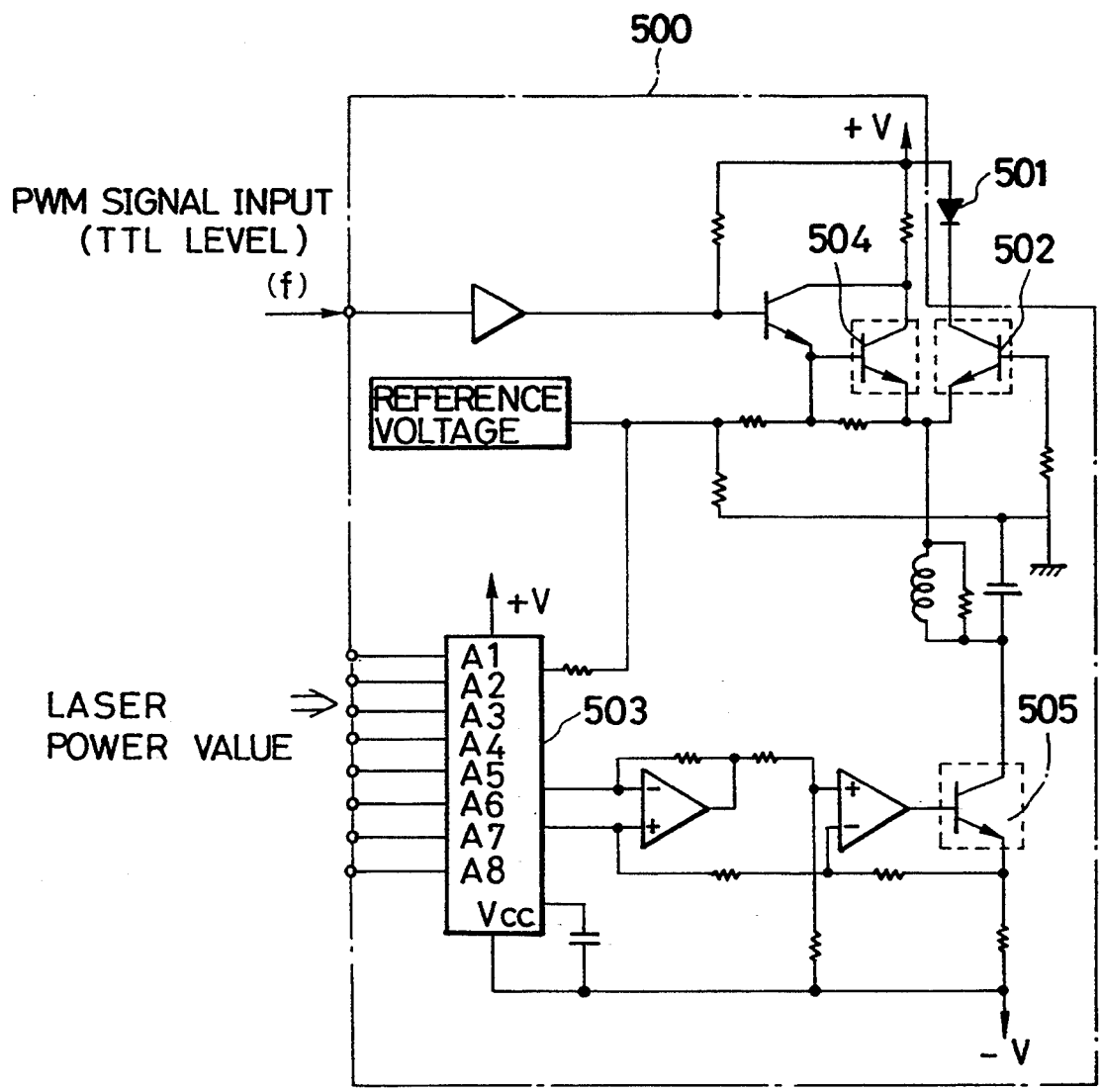
FIG. 10 is a circuit diagram of a laser driver circuit.
Figure 11:
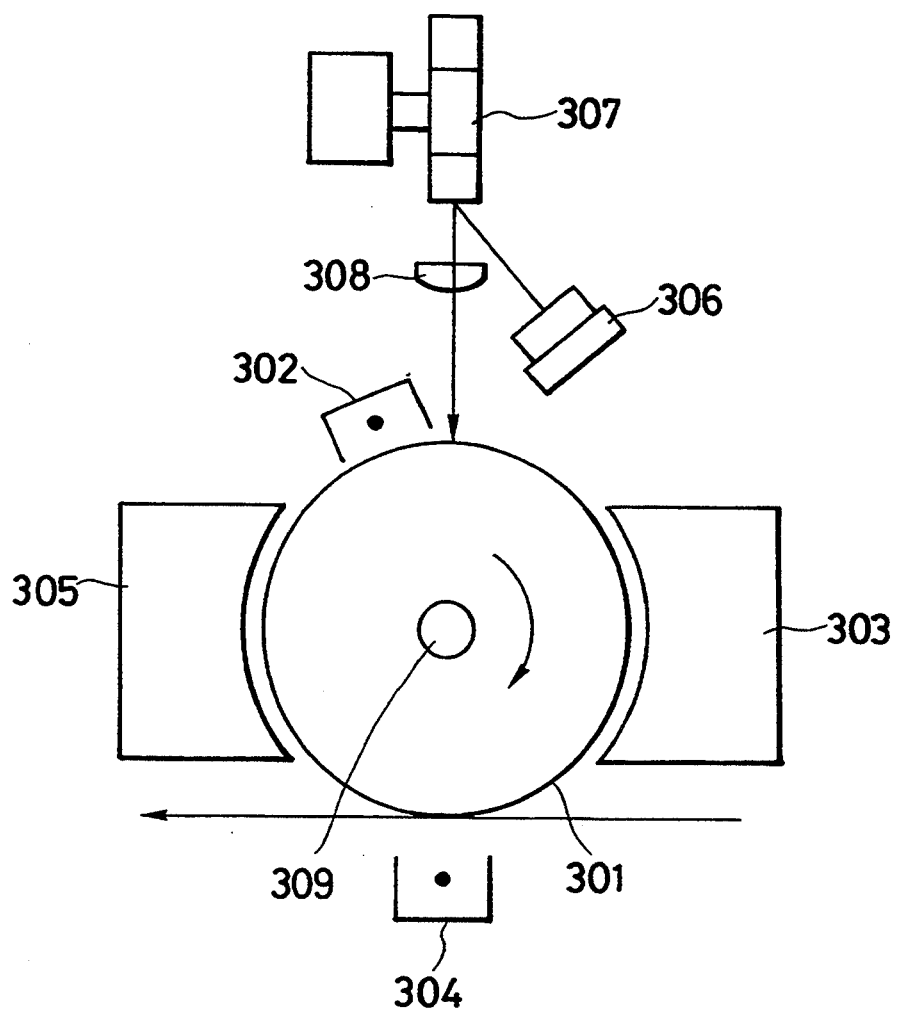
FIG. 11 is an illustration of the printer mechanism used in a laser beam printer.
Figure 12:
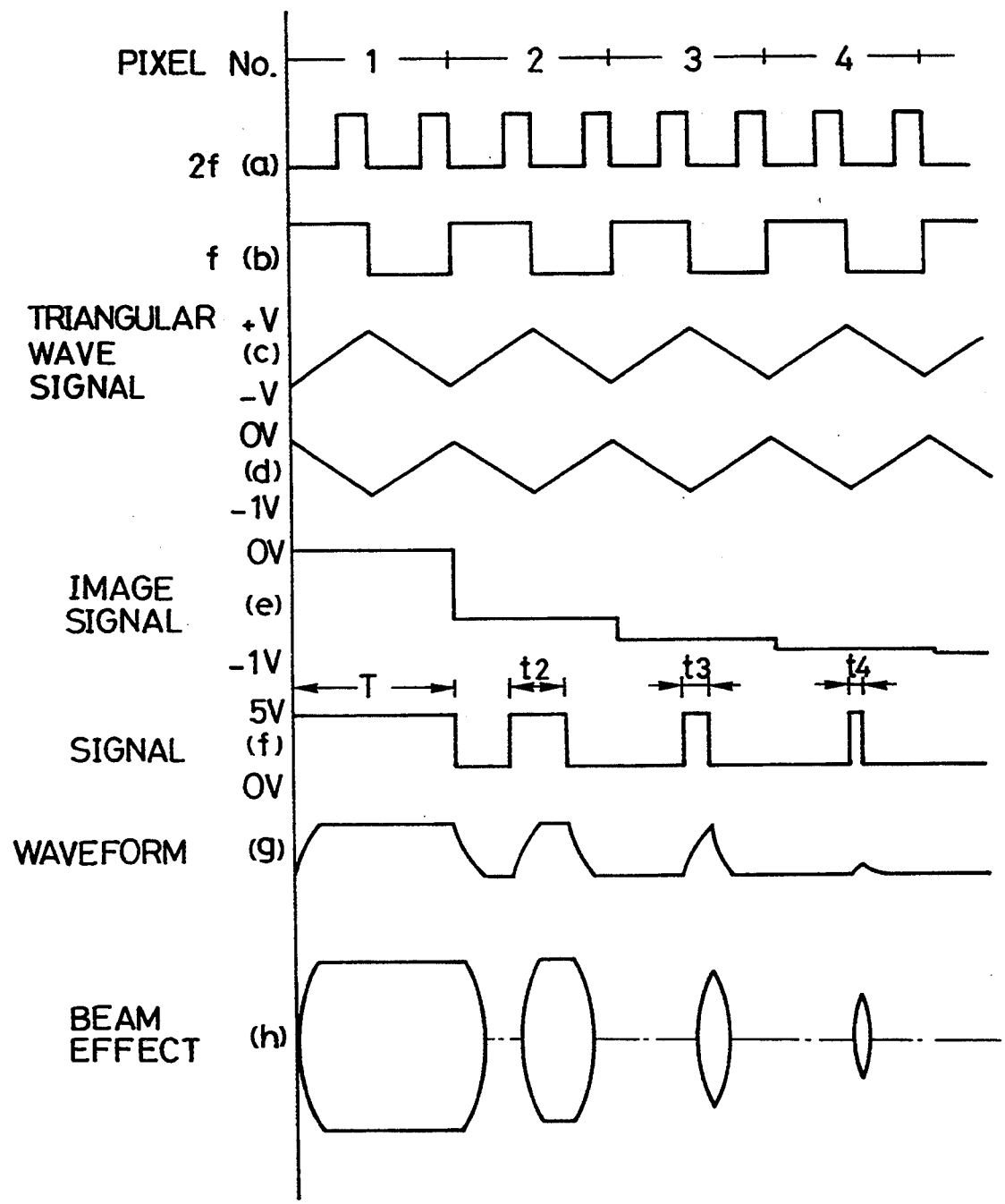
FIG. 12 is a timing chart illustrative of the operation of the PWM circuit.

In this Figure, a reference numeral 200 denotes a low-density portion binarizing circuit which binarizes pixel data of densities below a predetermined half-tone density. The detail of this circuit 200 will be described later. Numeral 400 denotes a PWM circuit which receives the pixel signal output from the low-density portion binarizing circuit 200 and conducts a pulse width modulation of the received signal, 500 denotes a driver circuit, and 501 denotes a semiconductor laser device. An image forming portion including a photosensitive drum 301 and other components is denoted by 300. Although not exclusive, the PWM circuit 400, laser driver circuit 500 and the image forming portion 300 have the constructions which are the same as those described before in connection with FIGS. 9, 10 and 11.

In this arrangement, an 8-bit input pixel signal A having 256 gradation levels is converted by the low-density portion binarizing circuit 200 into an 8-bit output image signal B suitable for a laser beam printer which operates in accordance with the PWM method. The image signal B is further input to the PWM circuit 400 and is used in forming a high-gradation image by an electrophotographic process performed by the image forming portion 300, through the operation of the laser driver circuit 500 and the semiconductor laser device 501.

Figure 2:
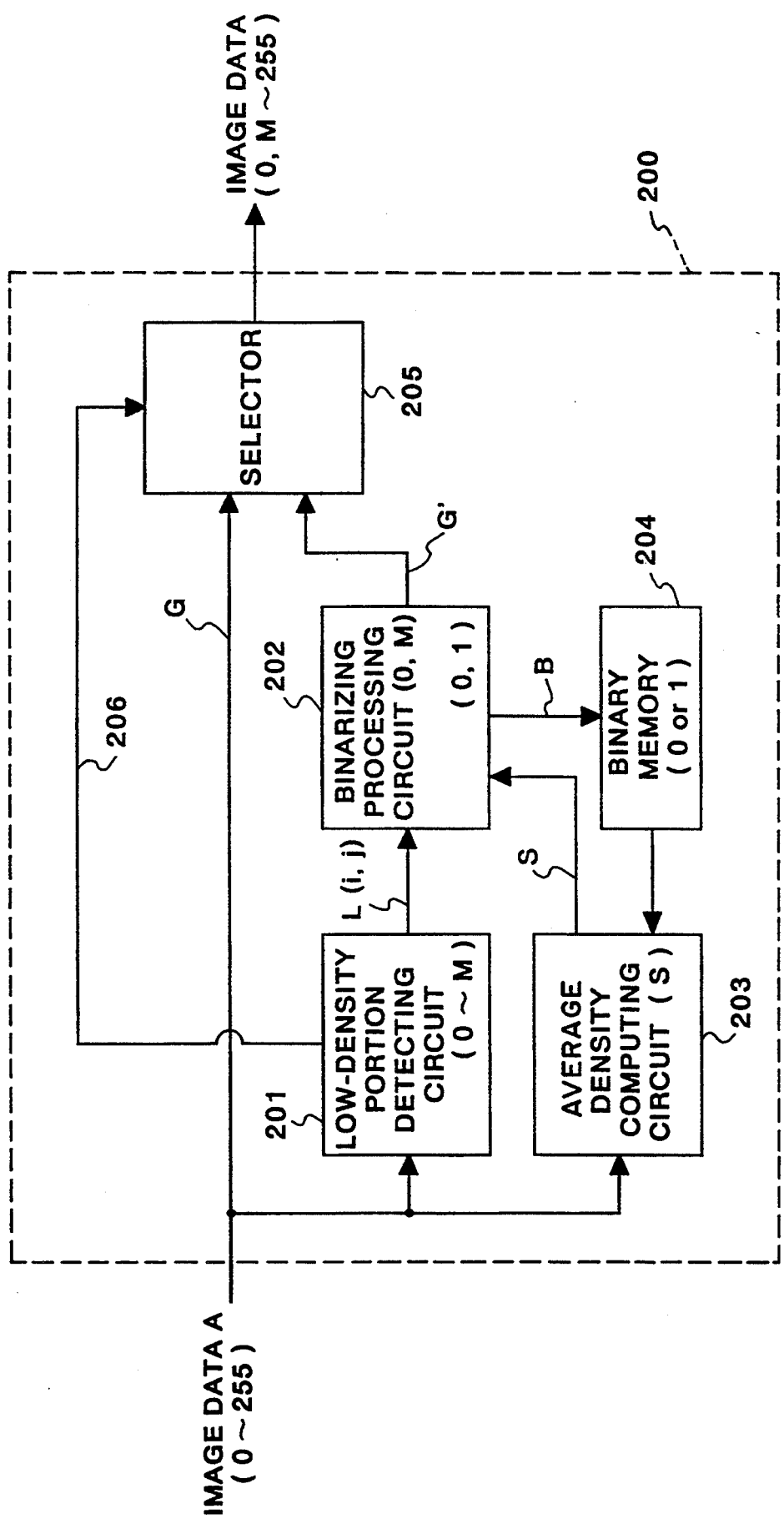
FIG. 2 is a block diagram of a low-density portion binarizing circuit used in the embodiment of FIG. 1.

FIG. 2 is a block diagram showing internal blocks of the low-density portion binarizing circuit used in the embodiment.

As will be seen from this Figure, the low-density portion binarizing circuit used in this embodiment has a low-density portion detecting circuit 201, a binarizing circuit 202, an average density calculating circuit 203, a binary memory 204 having a memory capacity corresponding to data of three lines, and a selector 205.

Briefly, the operation of this low-density portion binarizing circuit 200 is as follows. When the density value of the input image data A is not greater than the minimum half tone density "M" which can be reproducible by the image forming portion 300, the low-density portion binarizing circuit 200 changes the density value of this data either to "0" or "M" so as to form an output pixel which is delivered to the PWM circuit 400. However, when the density of the input pixel data A is greater than the above-mentioned half tone density level "M", the low-density portion binarizing circuit 200 directly passes this pixel data A to the PWM circuit 400 without effecting any change.

The detail of the operation of the low-density portion binarizing circuit 200 shown in FIG. 2 will be described in sequence.

Figure 4:
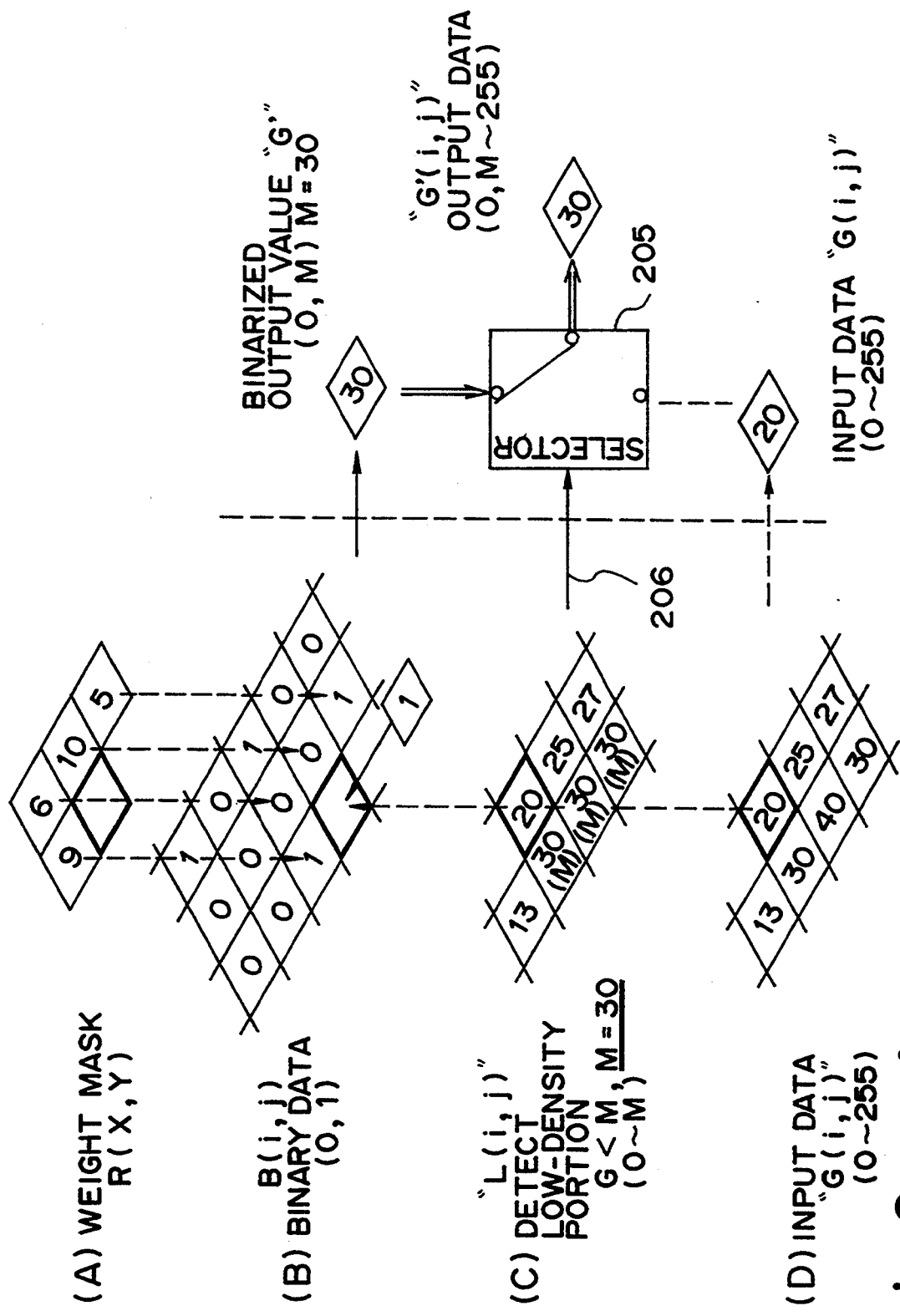
FIG. 4 which includes portions 4(A)–4(D) is an illustration of the process performed by the low-density portion binarizing circuit when the objective pixel has a density lower than the minimum reproducible density.

FIG. 4(D) shows an image data A (see FIG. 1) which is output from an external host computer or an image reader. For information, this image data A includes also data after a correction, as in the case of ordinary image processing system. FIG. 4(C) shows an example L(i, j) of conversion of the image data after the detection of only the low-density portion of the input image at a G(i, j). The conversion is conducted by using a threshold or a reference level which is a predetermined half tone density "M" in consideration of the gradation reproducibility in the highlight portion of image to be printed by a PWM type laser beam printer. In order to simplify the explanation, it is assumed here that the minimum pulse width $t_3$ which enables the laser beam printer to stably form a density is 10 ns ($t_3 = 10$ ns) and that the half tone density value M corresponding to this minimum pulse width is 30 (M=30). The value 30 is a value of decimal notation. In this embodiment, the value 30 means the 30th gradation level from among the 256 gradation levels, i.e., from 0 to 255, which can be reproduced in this embodiment.

In FIG. 4(D), values appearing in the respective frameworks represent the density values of these pixels. It is assumed here that the framework demarcated by thick lines corresponds to the objective pixel G (=G(i, j).

The value of the objective pixel G is compared by the value M, i.e., threshold level 30, which is beforehand stored in the low-density portion detecting circuit 201, and the result of the comparison is delivered through a signal line 206. At the same time, the low-density portion detecting circuit 201 delivers to the binarizing processing circuit 202 the following value as the converted value L (i, j).

On condition of G<M, L(i, j)←G(i, j)  (1)

On condition of G>M, L(i, j)←M  (2)

Thus, any density level of the objective pixel is delivered without being changed when the density level is below the threshold value "M", whereas, when the density level of the objective pixel is equal to or greater than the threshold level "M", the threshold level M is delivered as the converted value L(i, j).

The binarizing processing circuit 202 compares the converted value L(i, j) received from the low-density portion detecting circuit 201 with a average density value S which is delivered by the average density calculating circuit 203, thereby binarizing the converted value L(i, j) using the average density value S as the threshold, i.e., either into "0" (when the level of L(i, j) is equal to or below the average density level S) or "1" (when the level of L(i, j) is equal to or greater than the man density level "S"). The thus binarized value is stored in the binary memory 204.

The calculation of the average density level S by the average density calculating circuit 203 is conducted in a manner which will be described hereinunder. A group of data which have already been binarized are read from the binary memory 204 and is processed by a previously set weight mask. As shown in FIG. 4(A), the values in the weight mask form a substantially constant gradient in accordance with the distances from the objective pixel and the sum of the matrix elements is equal to the aforementioned predetermined half tone density value M which equals to 30. The average density value S is calculated by superposing this weight mask to the binary memory 204. In the case of the binary data shown in FIG. 4(B), the average density value S with respect to the objective pixel is calculated as follows:

$$S = 6 \times 0 + 10 \times 0 + 5 \times 1 + 9 \times 1 = 14$$

Figure 5:
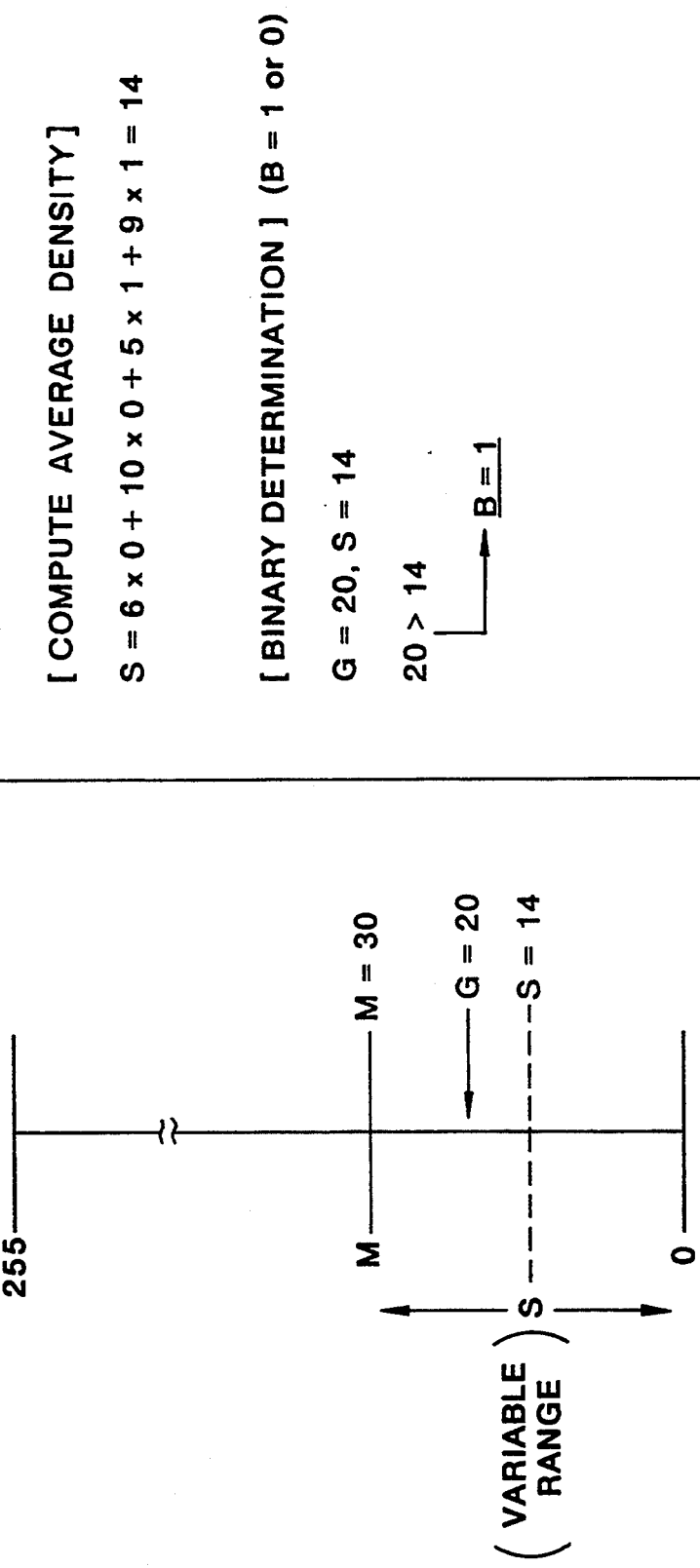
FIG. 5 is an illustration of a binary value discriminating process.

As will be seen from FIG. 5, the average density value S is variable within a range between 0 and M, i.e., between 0 and 30.

In the process shown in FIGS. 4(D) to 4(A), the initial value of the input objective pixel data is "20", so that the value "20" is output as the converted value L(i, j) from the low-density portion detecting circuit 201 to the binarizing processing circuit 202. At the same time, the average density calculating circuit 203 delivers "14" as the mean density value S to the binarizing processing circuit 202. In consequence, the condition L(i, j) > S is confirmed as a result of the determination by the binarizing processing circuit 202, so that the value "1" is written in the address of the objective pixel in the binary memory 204 (see FIG. 5).

On the basis of this result of determination, the binarizing processing circuit 202 outputs a correction data G' in accordance with the following rule.

| On condition of B = 1 | G' = 30 |
| On condition of B = 0 | G' = 0 |

Therefore, in the case of the process explained in connection with FIGS. 4(D) to 4(A) in which the condition of B = 1 is met, the correction data G' = 30 is input from the binarizing processing circuit 202 to one of the input terminals of the selector 205. Meanwhile, the other input terminal of the selector 205 receives the initial value G (= 20) of the objective pixel.

The selector 205 selects the correction data G' when it has judged that the initial value of the data of the objective pixel is below the minimum density M which is reproducible by the image forming portion 30, otherwise it selects the initial value G. The level of the signal delivered from the low-density detecting circuit 201 to the signal line 206 is used as the criterion for the selection performed by the selector. In the case of the process explained in connection with FIGS. 4(D) to 4(A), the density G of the objective pixel is "20" so that the selector 205 selects the data G' (= 30) which is output from the binarizing processing circuit 202 and delivers the same to a PWM circuit 400 shown in FIG. 1.

Figure 6:
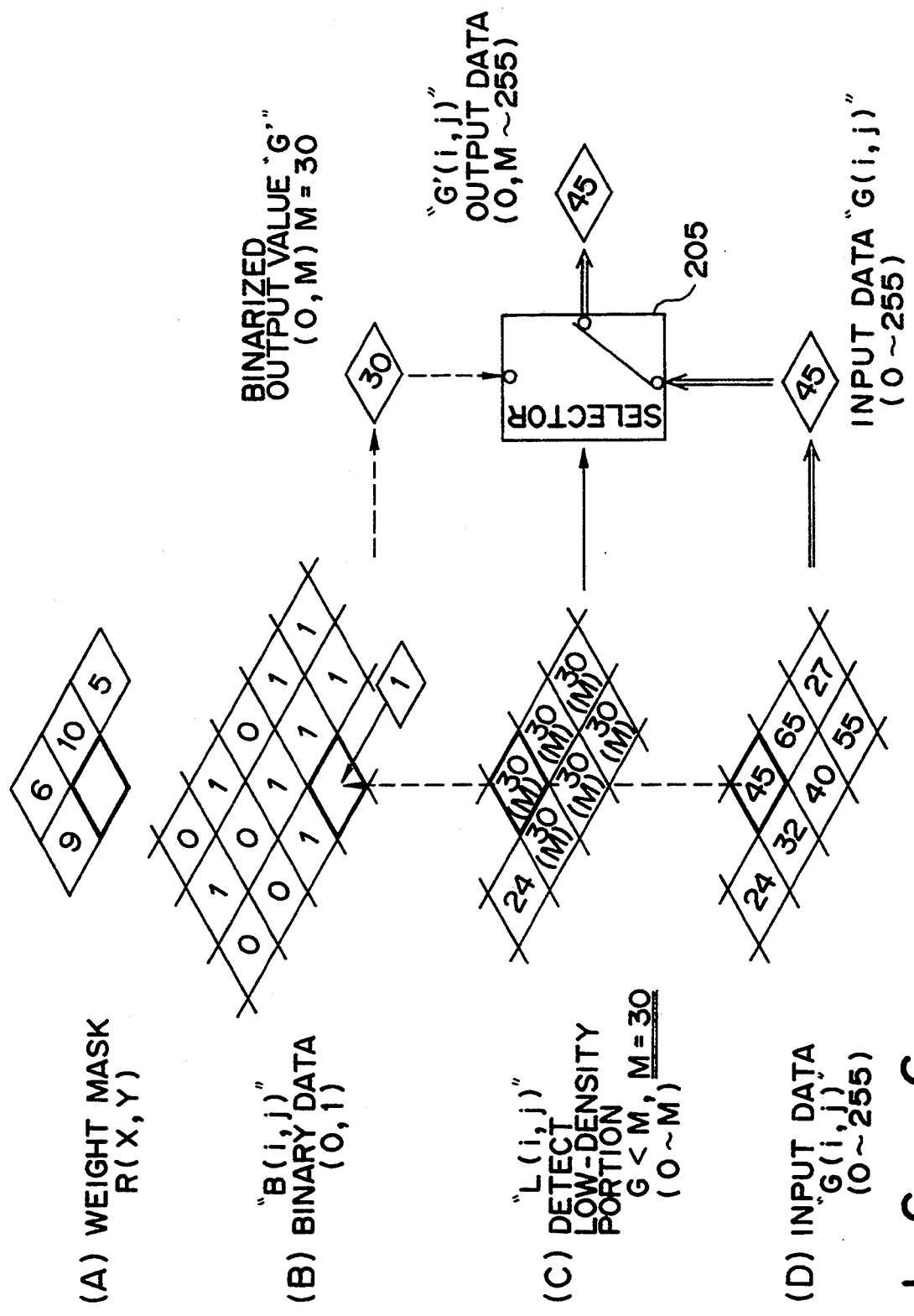
FIG. 6 is an illustration of the operation of the low-density portion binarizing circuit performed when the objective pixel has a density higher than the minimum reproducible density.

An example of the process which is conducted when the density G of the objective pixel meets the condition of G ≧ M will be described with reference to FIG. 6.

The density G of the input objective pixel is "45" so that "M(=30)" is output as the data L(i, j) from the low-density portion detecting circuit 201 and delivered to the binarizing processing circuit 202 (see FIGS. 6(C) and 6(D)). Therefore, the binarized signal B of the objective pixel is "1" regardless of the average density value S which is determined by the weight mask (see FIG. 6(A)). As a consequence, "1" and "30" are respectively delivered to the binary memory 204 and the selector 205. In this state, a signal indicating that the density value G of the objective pixel meets the condition of G ≧ M is delivered by the low-density portion detecting circuit 201 to the selector 205 through the signal line 206. Therefore, the selector 205 selects and outputs the initial data (data representing the density "45").

Thus, the input data is directly output without change when the level of the data ranges from M to 255 so that the density of the input data is maintained.

The condition B = 1 is stored as the binary data in the binary memory 204 whenever the condition of G ≧ M is confirmed.

Figure 3:
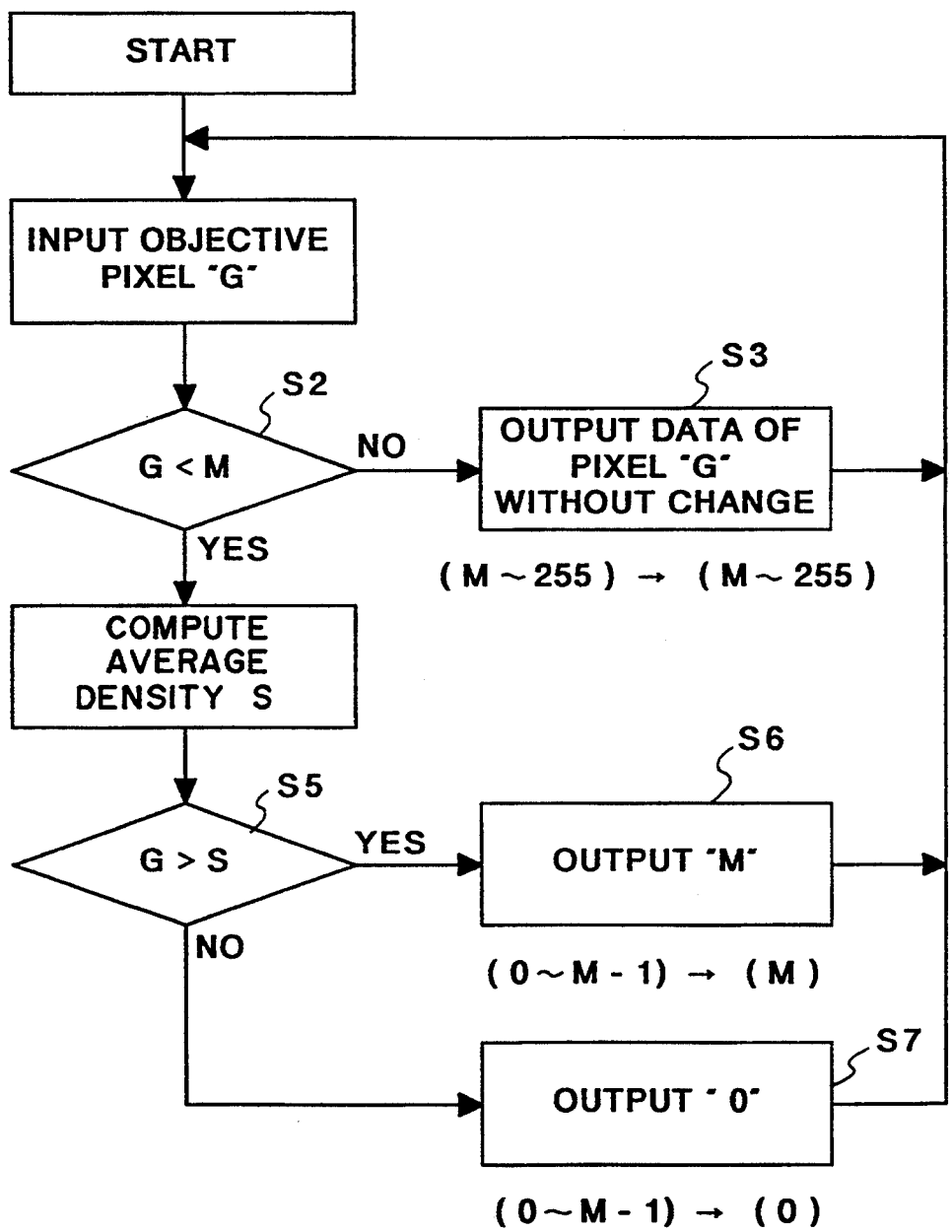
FIG. 3 is a flow chart illustrative of the content of processing of the low-density portion binarizing circuit.

The content of the process performed by the low-density portion binarizing processing circuit 200 in the described embodiment is as shown in the flow chart of FIG. 3.

In Step S1, the objective pixel G is input. Then, in Step S2, the value of the density of the objective pixel is compared with the minimum density value M which is reproducible by the image forming portion 300. If the condition of G ≧ M is determined as a result of the comparison, the process proceeds to Step S3 in which the density value G of the objective pixel is delivered to the PWM circuit 400 without any change.

Conversely, if the density G is determined as being G < M as a result of the comparison, the process proceeds to Step S4 in which the average density S is calculated on the basis of the binarized data around the objective pixel. Then, the process proceeds to Step S5 which compares the calculated average density value S with the density G of the objective pixel. If a condition G > S is confirmed as a result of the comparison, the value "M" is delivered to the PWM circuit 400 (Step S6), otherwise, i.e., when G ≦ S is confirmed, "0" is delivered to the PWM circuit 400 (Step S7).

By the process described hereinbefore, the input data having continuous 256 levels of gradation, i.e., from 0 to 255, is output as pixel data of "0" level or one of "M to 255" levels, i.e., data which do not employ levels of "1" to "M − 1". When the input data has a level which is not employed, i.e., when the level of this input data ranges from "1" to "M − 1", this input data is changed either to "0" or "M", but the overall density i preserved so that image of a good quality is obtained with a high degree of stability.

In the described embodiment, the threshold level M of the density is determined as the minimum density which is reproducible by the image forming portion 300. This, however, is only illustrative and the threshold level M may be set at any desired level so as to enable reproduction of the highlight portion of the image without using unstable image forming condition inherent in the electrophotographic process, whereby a stable reproduction of gradation is attained over the entire range of the density.

In the embodiment described hereinbefore, the minimum PWM pulse width $t_3$ which can produce a visible image is assumed to be 10 ns and the minimum density level M corresponding to this minimum pulse width is 30. These values, however, are introduced only for the purpose of illustration and are not intended for restricting the scope of the invention. Rather, it is expected that the factors such as the minimum pulse width $t_3$ and minimum density M fluctuate according to the characteristics of the image forming portion 300. It is therefore preferred that a switch for varying the set values of such factors is provided to enable a more delicate adjustment of gradation reproduction.

Another advantage offered by the described embodiment resides in the process for binarizing the data of the low-density portion, i.e., portions of low densities of 0 to M.

In general, when binarizing the data by changing it either to "0" or "M", it is a common measure to use a value M/2 as the threshold for the binarization. However, the use of such a value a the threshold poses a problem in that, even when a continuous smooth change of density level exists in the low-density portion, such a gradation is lost since the data is binarized by the fixed threshold, resulting in a large binarizing error and a serious degradation in the image quality.

In contrast, in the present invention, the threshold is varied to follow up a change in the image density, as will be understood from the foregoing description of the embodiment. It is therefore possible to reduce any binarizing error to an acceptable level and to reproduce any gentle change of density in a highlight portion with a high degree of exactness, regardless of the image density.

Figures 7, 8:
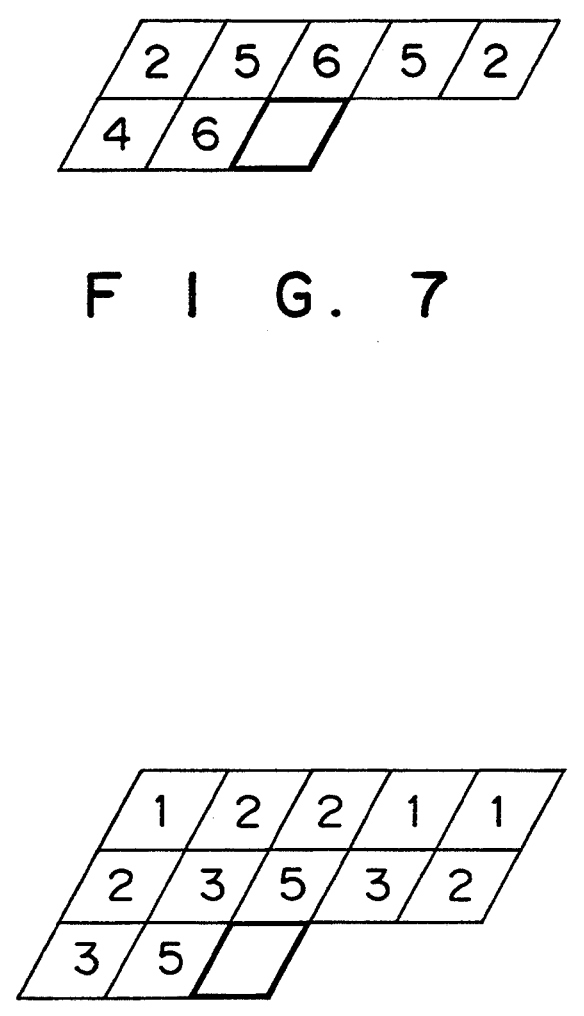

The distribution of the weight coefficient used in the average density calculating circuit 203 of the low-density portion detecting circuit 200 is related to edge stressing effect, such that the greater the range of distribution, the stronger the edge stressing effect. It is therefore possible to enhance the edge stressing effect by enlarging the mask pattern, e.g., from the weight matrix of FIG. 7 to the weight matrix shown in FIG. 8. It is advisable to prepare a plurality of weight matrices for free selection by the operator. This can be done by storing a plurality of mask patterns in the ROM and arranging such that the contents of the ROM is selectively delivered to the average density calculating circuit 203 through a selector switch. Alternatively, a RAM is used in lace of the ROM so as to enable the user to freely change the values in the matrix. In this case, restriction concerning the type of the matrix are substantially eliminated.

Although a laser beam printer is used in the described embodiment, this is not exclusive and other types of printers which reproduce the gradation through the control of the intensity of beam applied to a photosensitive member such as a drum.

As has been described, according to the present invention, it is possible to obtain an output image with a high degree of stability of density in highlight portion.

In particular, when the density levels of the input multi-level pixel data is equal to or below the minimum reproducible level, such levels are binarized by being changed either to the minimum density or the minimum reproducible density, whereby the width of the gradation level which can safely be preserved is maximized.

Furthermore, since the binarizing processing is executed such that the densities are preserved within the range of binarization, whereby the whole density levels of the output image are preserved with respect to the input image.

In the described embodiment, the low-density portion binarizing circuit 200 is provided in the laser beam printer as a component of the latter. This, however, is only illustrative and the arrangement may be such that the low-density portion binarizing circuit 200 as an independent device is connected between a host computer and an image forming device such as a laser beam printer. In such a case, the low-density portion binarizing device, constructed in accordance with the present invention, makes it possible to form an image with reduced deterioration of the image quality in the highlight portion even with conventional printers.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which receives multi-level objective pixel data and delivers the received data to an image forming apparatus capable of forming a gradation image, said image processing apparatus comprising:

determining means for determining whether the density level of the received multi-level objective pixel data is below a predetermined reproducible density level defined in multi-level terms; and binarizing means for binarizing the multi-level objective pixel data by changing the data either to a minimum density level or to the predetermined reproducible density level in accordance with the received multi-level pixel data, an output average density obtained from an output a result of the binarization and a binarized error generated by the binarization, when said determining means has determined that the density level of the objective pixel data is below the predetermined reproducible density level, wherein said binarizing means conducts the binarization of the data between the minimum density level and the predetermined reproducible density level and outputs a result of the binarization in such manner as to preserve average density of the received data.

2. An image processing apparatus according to claim 1, wherein the predetermined reproducible density level is the minimum reproducible density level except for the minimum density level.

3. An image processing apparatus according to claim 1, wherein said binarizing means conducts the binarization of the data between the minimum reproducible density level and the predetermined density level so as to preserve any binarization error incurred as a result of the binarization.

4. An image processing apparatus according to claim 1, wherein said binarizing means includes:

a memory for storing data which represents whether the binarization has been done to the minimum density level at the positions of a plurality of binarized pixels in the vicinity of the multi-level objective pixel;

calculating means for calculating the average density at the position of the multi-level objective pixel data in said memory;

comparing means for comparing the calculated average density with the density of the multi-level objective pixel data;

output means for outputting the predetermined density level as the multi-level objective pixel data when said comparing means has determined that the multi-level objective pixel data is not lower than the average density and for outputting the minimum density level as the multi-level objective pixel data when said comparing means has determined that the multi-level objective data is not higher than the average density; and storage means for storing, as the result of the binarization of the multi-level objective pixel data, the result of the comparison in said memory at the position of the objective pixel.

5. An image processing apparatus according to claim 4, wherein said calculating means has a matrix with weight coefficients and computes the average density at the position of the objective pixel data on the basis of the values of coefficients in the matrix and the information at the positions in said memory corresponding to said coefficients.

6. An image processing apparatus according to claim 5, wherein said calculating means includes:
   matrix memory means for storing a plurality of matrices of different sizes; and
   selection means for enabling selection of one of the stored matrices,
   whereby the calculation of the average density is conduced on the basis of the selected matrix.

7. An image processing apparatus according to claim 5, wherein the weight coefficients in the matrix are determined according to the distance from the objective pixel, such that the smaller the distance from the objective pixel, the greater the value of the weight coefficient.

8. An image processing apparatus according to claim 6, wherein the weight coefficients in the matrix are determined according to the distance from the objective pixel, such that the smaller the distance from the objective pixel, the greater the value of the weight coefficient.

9. An image processing apparatus which receives multi-level pixel data and for forming a gradation image on the basis of the received multi-level pixel data, said apparatus comprising:
   determining means for determining whether the density level of the received multi-level objective pixel data is below a predetermined reproducible density level defined in multi-level terms;
   binarizing means for binarizing the multi-level objective pixel data by changing the data either to a minimum density level or to the predetermined reproducible density level, when said determining means has determined that the density level of the multi-level objective pixel data is below the predetermined reproducible density level; and
   pulse-width-modulation means for modulating the received multi-level pixel data to a pulse-width modulated data in accordance with the received multi-level data when said determining means has determined that the density level of the multi-level objective pixel data exceeds said predetermined reproducible density level and for generating non-reproducible pulse-width data or predetermined reproducible pulse-width data based on the result produced by said binarizing means when said determining means has determined the density level of the multi-level objective pixel data is below the predetermined reproducible density level.

10. An image processing apparatus according to claim 9, wherein said binarizing means binarizes the pixel data in accordance with the received multi-level pixel data, an output average density obtained from an output result of the binarization and a binarized error generated by the binarization.

11. An image processing apparatus according to claim 9, wherein the predetermined reproducible density level is the minimum reproducible density level except for the minimum density level.

12. An image processing apparatus according to claim 9, wherein said binarizing means conducts the binarization of the data between the minimum reproducible density level and the predetermined density level so as to preserve any binarization error incurred as a result of the binarization.

13. An image processing apparatus according to claim 9, wherein said binarizing means includes:
   a memory for storing data which represents whether the binarization has been done to the minimum density level at the positions of a plurality of binarized pixels in the vicinity of the multi-level objective pixel;
   calculating means for calculating the average density at the position of the multi-level objective pixel data;
   output means for outputting the predetermined density level as the multi-level objective pixel data when said comparing means has determined that the multi-level objective pixel data is not lower than the average density and for outputting the minimum density level as the multi-level objective pixel data when said comparing means has determined that the multi-level objective data is not higher than the average density; and
   storage means for storing, as the result of the binarization of the multi-level objective pixel data, the result of the comparison in said memory at the position of the objective pixel.

14. An image processing apparatus according to claim 13, wherein said calculating means has a matrix with weight coefficients and computes the average density at the position of the objective pixel on the basis of the values of coefficients in the matrix and the information at the positions in the memory corresponding to the coefficients.

15. An image processing apparatus according to claim 14, wherein said calculating means includes:
   matrix memory means for storing a plurality of matrices of different sizes; and
   selection means for enabling selection of one of the stored matrices,
   whereby the calculation of the average density is conduced on the basis of the selected matrix.

16. An image processing apparatus according to claim 14, wherein the weight coefficients in the matrix are determined according to the distance from the objective pixel, such that the smaller the distance from the objective pixel, the greater the value of the weight coefficient.

17. An image processing apparatus according to claim 15, wherein the weight coefficients in the matrix are determined according to the distance from the objective pixel, such that the smaller the distance from the objective pixel, the greater the value of the weight coefficient.

18. An image processing apparatus which receives multi-level pixel data and for forming a gradation image on the basis of the received multi-level pixel data, said apparatus comprising:
   determining means for determining whether the density level of the input multi-level objective pixel data is below a predetermined reproducible density level;
   binarizing means for binarizing the multi-level objective pixel data by changing the data either to a minimum density level or to the predetermined reproducible density level defined by multi-level, when said determining means has determined that the multi-level objective pixel data is below the predetermined reproducible density level;
   selection means for selecting one of the input multi-level pixel data and the binarized data output by said binarizing means; and pulse-width-modulation means for modulating the received multi-level pixel data to a pulse-width modulated data in accordance with the received multi-level pixel data when said determining means has determined that the density level of the multi-level objective pixel data exceeds the predetermined density level and for generative non-reproducible pulse-width data based on the result produced by said binarizing means when said determining means has determined that the density level of the multi-level objective pixel data is below the predetermined density level, wherein said binarizing means conducts the binarization of the data between the minimum density level and for predetermined reproducible density level in accordance with the received multi-level pixel data and outputs the result produced by said binarizing means in such manner as to preserve average density of the received data.

19. An image processing apparatus according to claim 18, wherein said binarizing means binarizes the pixel data in accordance with the received multi-level pixel data, an output average density obtained from an output result of the binarization and a binarized error generated by the binarization.

20. An image processing apparatus according to claim 18, wherein said selection means selects the data binarized by said binarizing means when the input multi-level objective pixel data is below the predetermined level, and otherwise selects the input multi-level objective pixel data.

21. An image processing apparatus according to claim 18, wherein said binarizing means conducts the binarization of the data between the minimum density level and the predetermined density level so as to preserve any binarization error incurred as a result of the binarization.

22. An image processing apparatus according to claim 21, wherein said binarizing means includes:

a memory for storing data which represents whether the binarization has been done to the minimum density level at the positions of a plurality of binarized pixels in the vicinity of the multi-level objective pixel;

calculating means for calculating the average density at the position of said multi-level objective pixel data in said memory;

comparing means for comparing the calculated average density with the density of the multi-level objective pixel data;

output means for outputting the predetermined density level as the multi-level objective pixel data when said comparing means has determined that the multi-level objective pixel data is not lower than the average density and for outputting the minimum density level as the multi-level objective pixel data when said comparing means has determined that the multi-level objective data is not higher than the average density; and storage means for storing, as the result of the binarization of the multi-level objective pixel data, the result of the comparison in said memory at the position of the objective pixel.

* * * * *

UNITED STATES PATENT AND TRADEMARK OFFICE
CERTIFICATE OF CORRECTION

PATENT NO. : 5,359,433

DATED : October 25, 1994

INVENTORS : YUKIO NAGASE ET AL.

Page 1 of 3

It is certified that error appears in the above-identified patent and that said Letters Patent is hereby corrected as shown below:

ON THE TITLE PAGE

At [56] References Cited

Under "FOREIGN PATENT DOCUMENTS"

"4316199 7/1965 Japan" should read --43-161997/1968 Japan.--

COLUMN 1

Line 16, "printers" should read --printer--.
Line 27, "are" should read --art--.
Line 40, "with" should be deleted.
Line 66, "polygon," should read --polygonal--.

COLUMN 2

Line 55, "half" should read --half- --.
Line 58, "half tone" should read --half-tone--.
Line 64, "i" should read --is--.

COLUMN 3

Line 38, change "whole through one pixel" to --through one complete pixel--.

UNITED STATES PATENT AND TRADEMARK OFFICE
CERTIFICATE OF CORRECTION

PATENT NO. : 5,359,433

DATED : October 25, 1994

INVENTORS : YUKIO NAGASE ET AL.

It is certified that error appears in the above-identified patent and that said Letters Patent is hereby corrected as shown below:

COLUMN 6

Line 38, "G>M," should read --$G \geq M$,--.
Line 60, "have" should read --has-- and "are" should read --is--.
Line 66, "half tone" should read --half-tone--.

COLUMN 8

Line 37, "i" should read --is--.

COLUMN 9

Line 2, "a" should read --as--. (second occurrece)
Line 27, "is" should read --are--.
Line 30, "lace" should read --place--.
Line 32, "restriction" should read --restrictions--.
Line 43, "is" should read --are--.

UNITED STATES PATENT AND TRADEMARK OFFICE
CERTIFICATE OF CORRECTION

PATENT NO. : 5,359,433

DATED : October 25, 1994

INVENTORS : YUKIO NAGASE ET AL.

It is certified that error appears in the above-identified patent and that said Letters Patent is hereby corrected as shown below:

COLUMN 12

Line 30, "the" should read --said--.

Signed and Sealed this

Eleventh Day of April, 1995

Attest:

BRUCE LEHMAN

*Attesting Officer*   Commissioner of Patents and Trademarks